United States Patent
Choi et al.

(10) Patent No.: US 7,768,417 B2
(45) Date of Patent: Aug. 3, 2010

(54) MOVING APPARATUS, METHOD, AND MEDIUM FOR COMPENSATING POSITION OF THE MOVING APPARATUS

(75) Inventors: Ki-wan Choi, Yongin-si (KR); Hyoung-ki Lee, Yongin-si (KR); Seok-won Bang, Yongin-si (KR); Dong-yoon Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 479 days.

(21) Appl. No.: 11/707,992

(22) Filed: Feb. 20, 2007

(65) Prior Publication Data
US 2007/0290828 A1 Dec. 20, 2007

(30) Foreign Application Priority Data
Jun. 16, 2006 (KR) .................. 10-2006-0054571

(51) Int. Cl.
G08B 21/00 (2006.01)
(52) U.S. Cl. .................. 340/686.1; 340/691.4; 340/680
(58) Field of Classification Search ............. 340/686.1, 340/685, 686.6, 691.4, 691.8, 679–680; 700/245, 258, 260, 264, 44, 56, 85, 91; 318/568.11, 318/568.12, 568.1
See application file for complete search history.

(56) References Cited

U.S. PATENT DOCUMENTS

| | | | | |
|---|---|---|---|---|
| 6,374,157 | B1 * | 4/2002 | Takamura | 700/245 |
| 6,463,356 | B1 * | 10/2002 | Hattori et al. | 700/245 |
| 6,999,851 | B2 * | 2/2006 | Kato et al. | 700/245 |
| 7,013,201 | B2 * | 3/2006 | Hattori et al. | 700/245 |
| 7,272,467 | B2 * | 9/2007 | Goncalves et al. | 700/245 |
| 2004/0016077 | A1 * | 1/2004 | Song et al. | 15/319 |

FOREIGN PATENT DOCUMENTS

| | | |
|---|---|---|
| CN | 1309597 | 8/2001 |
| CN | 1381340 | 11/2002 |
| CN | 1759798 | 4/2006 |
| JP | 63-47806 | 2/1988 |
| JP | 5-211701 | 8/1993 |
| JP | 6-284518 | 10/1994 |
| JP | 9-329438 | 12/1997 |
| JP | 11/102220 | 4/1999 |

(Continued)

OTHER PUBLICATIONS

Chinese Office Action dated Jul. 24, 2009 issued in Chinese Patent Application No. 200710090493.2.

(Continued)

*Primary Examiner*—Daniel Previl
(74) *Attorney, Agent, or Firm*—Staas & Halsey LLP

(57) ABSTRACT

Provided are a moving apparatus and an apparatus, method, and medium for compensating position based on a position recognition technology. The moving apparatus which provides a function for correcting a position includes a sensing unit obtaining multiple state information reflecting one or more abnormal movement states generated by movements of the moving apparatus; a state determination unit determining whether or not the abnormal movement state is generated by self-contained navigation, by referring to the obtained multiple state information; and a position information calculation unit calculating final position information of the moving apparatus, by correcting the multiple state information as the abnormal movement state occurs.

24 Claims, 4 Drawing Sheets

FOREIGN PATENT DOCUMENTS

| | | |
|---|---|---|
| JP | 2000-330639 | 11/2000 |
| JP | 2000-339599 | 12/2000 |
| JP | 2002-215236 | 7/2002 |
| JP | 2004-306251 | 11/2004 |
| JP | 2005-215742 | 8/2005 |
| JP | 2006-110676 | 4/2006 |

OTHER PUBLICATIONS

Abstract of JP2007-334896, corresponding to the present U.S. Appl. No. 11/707,992, 1 pg.

Japanese Office Action for corresponding Japanese Patent Application No. 2007-156469 dated Dec. 15, 2009, 4 pages.

* cited by examiner

MOVING APPARATUS, METHOD, AND MEDIUM FOR COMPENSATING POSITION OF THE MOVING APPARATUS

CROSS-REFERENCE TO RELATED APPLICATIONS

This application claims the benefit of Korean Patent Application No. 10-2006-0054571 filed on Jun. 16, 2006 in the Korean Intellectual Property Office, the disclosure of which is incorporated herein by reference in its entirety.

BACKGROUND OF THE INVENTION

1. Field of the Invention

The present invention relates to a position recognition technology of a moving apparatus, and more particularly, to a moving apparatus providing a position correction function by which accurate position recognition can be performed even when the moving apparatus is in an abnormal movement state, such as collision with an obstacle, slipping, passing an obstacle and kidnapping, which can occur when a moving apparatus, such as a cleaning robot, moves, and a method and medium of correcting a position.

2. Description of the Related Art

In general, robots have been developed for industrial purposes and have been used for factory automation or used to perform jobs that replace human labor in extreme environments that that are unfavorable to human beings. With applications in the recent sophisticated space development industry, the robot engineering field has been continuously developed and more recently, even human-friendly home robots have been developed. In addition, replacing medical equipment, robots can be inserted into the living body of a human being, and used to treat small organs of the body that cannot be treated by conventional medical equipment. This rapid development has highlighted the robot engineering field as a high technology field to emerge, following the Internet led information revolution and the currently widespread biotechnology field.

With regard to robot engineering, home robots have played a major role in the expansion of the conventional robot engineering field, which centered on the heavy industry field and was limited to industrial robots, to light industry oriented robot engineering. A leading example is a cleaning robot. Cleaning robots are generally composed of a driving unit for movement, a cleaning unit for cleaning, and a monitoring unit for sensing obstacles in all directions.

Here, the moving cleaning robot travels in such a manner that, by using the monitoring unit in a limited area, if an obstacle appears, the moving robot changes its direction of movement, or the moving robot calculates its position by using a predetermined unit, and identifies an object area to be cleaned, and then, moves along an optimum path so that the cleaning time and energy consumption can be reduced.

Thus, in moving apparatuses traveling in a predetermined area, including the recent moving robots, a technology for identifying the position of the apparatus, that is, for precisely recognizing the position of the apparatus is essentially required.

However, in the case of an encoder used in the conventional technology for recognizing the position of a robot, as the traveling time increases, position errors can accumulate by, for example, a slip phenomenon. In particular, the position error can be worsened by collision with an obstacle, or due to a movement to avoid an obstacle, and when the robot passes a low obstacle, such as a threshold. As another example of the conventional technology for identifying the position of the robot, a gyroscope may be used. However, the use of the gyroscope also involves accumulation of position errors when the gyroscope rotates in a situation the robot passes a low obstacle. Also, in the case of so-called kidnapping in which the position of the moving robot is changed by a person, the robot may not be able to recognize its position.

SUMMARY OF THE INVENTION

Additional aspects, features, and/or advantages of the invention will be set forth in part in the description which follows and, in part, will be apparent from the description, or may be learned by practice of the invention.

The present invention provides a moving apparatus providing a function for correcting a position, in which by using an accelerometer together with an encoder and a gyroscope, an abnormal state of a moving robot, such as slipping, collision with an obstacle, passing through an obstacle, and kidnapping of the moving robot, is determined and errors can be minimized and corrected, and a method of correcting a position.

The above stated object as well as other objects, features and advantages, of the present invention will become clear to those skilled in the art upon review of the following description, the attached drawings and appended claims.

According to an aspect of the present invention, there is provided a moving apparatus providing a function for correcting a position, the apparatus including a sensing unit obtaining multiple state information reflecting one or more abnormal movement states generated by movements of the moving apparatus, a state determination unit determining whether or not the abnormal movement state is generated by self-contained navigation, by referring to the obtained multiple state information, and a position information calculation unit calculating final position information of the moving apparatus, by correcting the multiple state information if the abnormal movement state occurs.

According to another aspect of the present invention, there is provided a method of correcting a position, the method including obtaining multiple state information reflecting one or more abnormal movement states generated by movements of a moving apparatus, determining whether or not the abnormal movement state is generated by self-contained navigation, by referring to the obtained multiple state information, correcting the multiple state information as the abnormal movement state occurs, and thus calculating final position information of the moving apparatus, generating an action control signal by referring to the calculated final position information, and performing a movement action of the moving apparatus by referring to the generated action control signal.

According to another aspect of the present invention, there is provided a moving apparatus including a sensing unit to obtain multiple state information generated by movements of the moving apparatus; a state determiner to determine whether or not an abnormal movement state is generated based on the multiple state information; and a position information calculator to correct the multiple state information when the abnormal movement state occurs, and to calculate final position information of the moving apparatus.

According to another aspect of the present invention, there is provided a method of correcting a position of a moving apparatus, the method including obtaining multiple state information generated by movements of the moving apparatus; determining whether or not the abnormal movement state is generated based on the obtained multiple state information; correcting the multiple state information when the abnormal movement state occurs, and calculating final position information of the moving apparatus; generating an action control signal by referring to the calculated final position information; and performing a movement action of the moving apparatus by referring to the generated action control signal.

According to another aspect of the present invention, there is provided a method of correcting a position of a moving apparatus, the method including obtaining multiple state information generated by movements of the moving apparatus; determining whether or not the abnormal movement state is generated based on the obtained multiple state information; correcting the multiple state information when the abnormal movement state occurs, and calculating final position information of the moving apparatus.

According to another aspect of the present invention, there is provided at least one computer readable medium storing computer readable instructions to implement methods of the present invention.

BRIEF DESCRIPTION OF THE DRAWINGS

The above and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
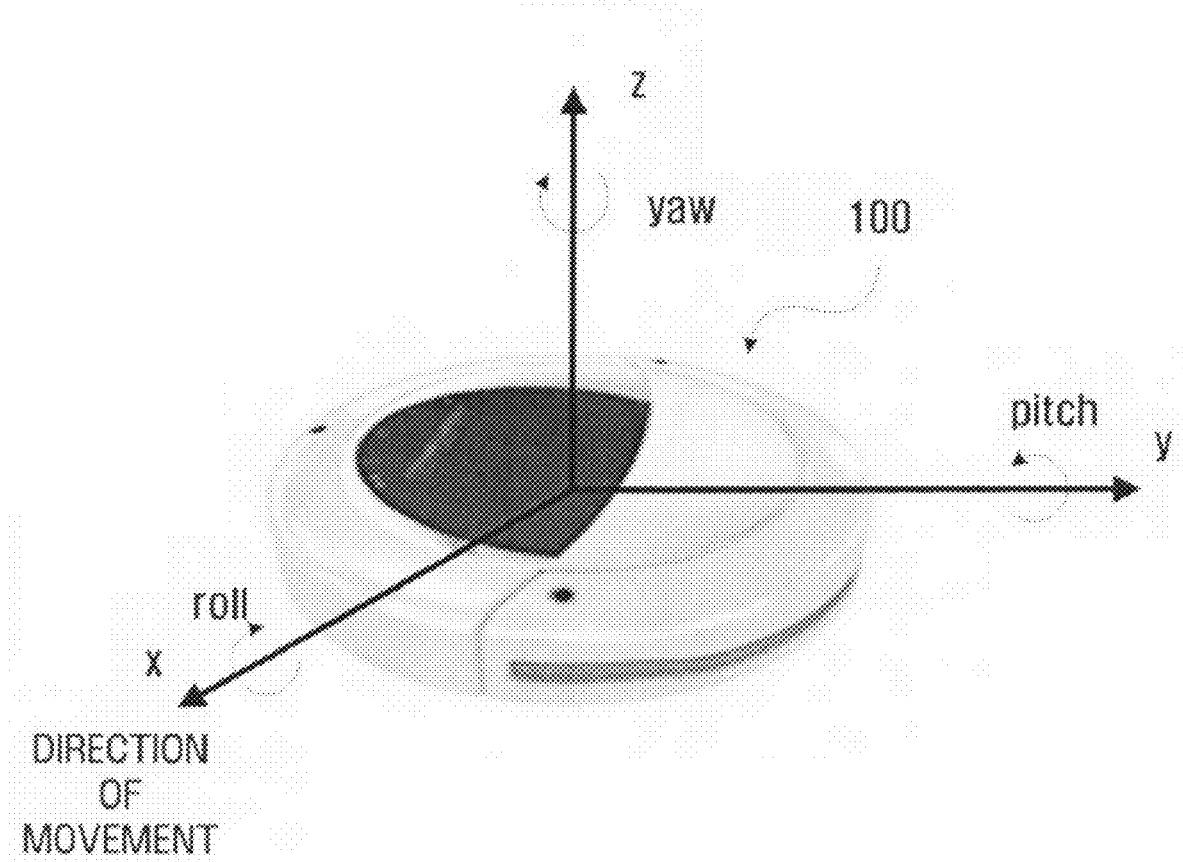
FIG. 1 illustrates a 3-dimensional (3D) space coordinate system based on a direction of movement of a moving apparatus according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

An exemplary embodiment of the present invention will be described with reference to a cleaning robot, which is considered to be a leading example of a moving apparatus. However, exemplary embodiments are applicable to any moving apparatus (e.g., a moving robot or mobile robot).

Recognition by a moving robot of its own position can be achieved by an encoder sensing position changes or speed changes of the moving robot, and by a gyroscope sensing changes in the rotation angle of the moving robot by identifying the motion of the inertial mass of the moving robot.

The encoder is generally used to control motion of the moving robot when a command for moving the position or changing the direction of the moving robot is given and the moving robot moves according to the command. When the encoder is used, the position of the moving robot can be identified by measuring the amount of rotation of a wheel of the moving robot at predetermined time intervals and integrating the measured amounts. However, the encoder has a drawback in that errors can accumulate whenever an integration operation is performed. In particular, when slipping of the driving wheel occurs or changes in the vertical direction of the driving wheel occurs when the moving robot passes an obstacle, a relatively excessive error occurs. Accordingly, in an exemplary embodiment of the present invention, an accelerometer sensing acceleration components of three (3) axes and gravitational acceleration is additionally used so that the errors can be reduced.

A 3-dimensional (3D) space coordinate system will be introduced in order to explain a position correction function of the moving robot for reducing this error. FIG. 1 illustrates a 3-dimensional (3D) space coordinate system based on a direction of movement of a moving apparatus according to an exemplary embodiment of the present invention.

As illustrated in FIG. 1, it is assumed that a moving apparatus 100 (e.g., a moving robot) travels in an x direction, and that the y direction is perpendicular to the x direction and in parallel with the ground and the z direction is perpendicular to the ground. When the moving apparatus 100 passes an obstacle or a slope, the body of the moving apparatus 100 may be tilted and rotated. In this case, it assumed that a rotation direction about the x axis is a roll direction, a rotation direction about the y axis is a pitch direction, and a rotation direction about the z axis is a yaw direction. Also, it is assumed that when an abnormal state (abnormal movement state), for example, a state when the moving apparatus 100 passes an obstacle, occurs, the angle of the moving apparatus 100 from the x axis with the z axis as the rotation axis is θ, the angle of the moving apparatus 100 from the z axis with the y axis as the rotation axis is φ, and the angle of the moving apparatus 100 from the y axis with the x axis as the rotation axis is ψ.

Figure 2:
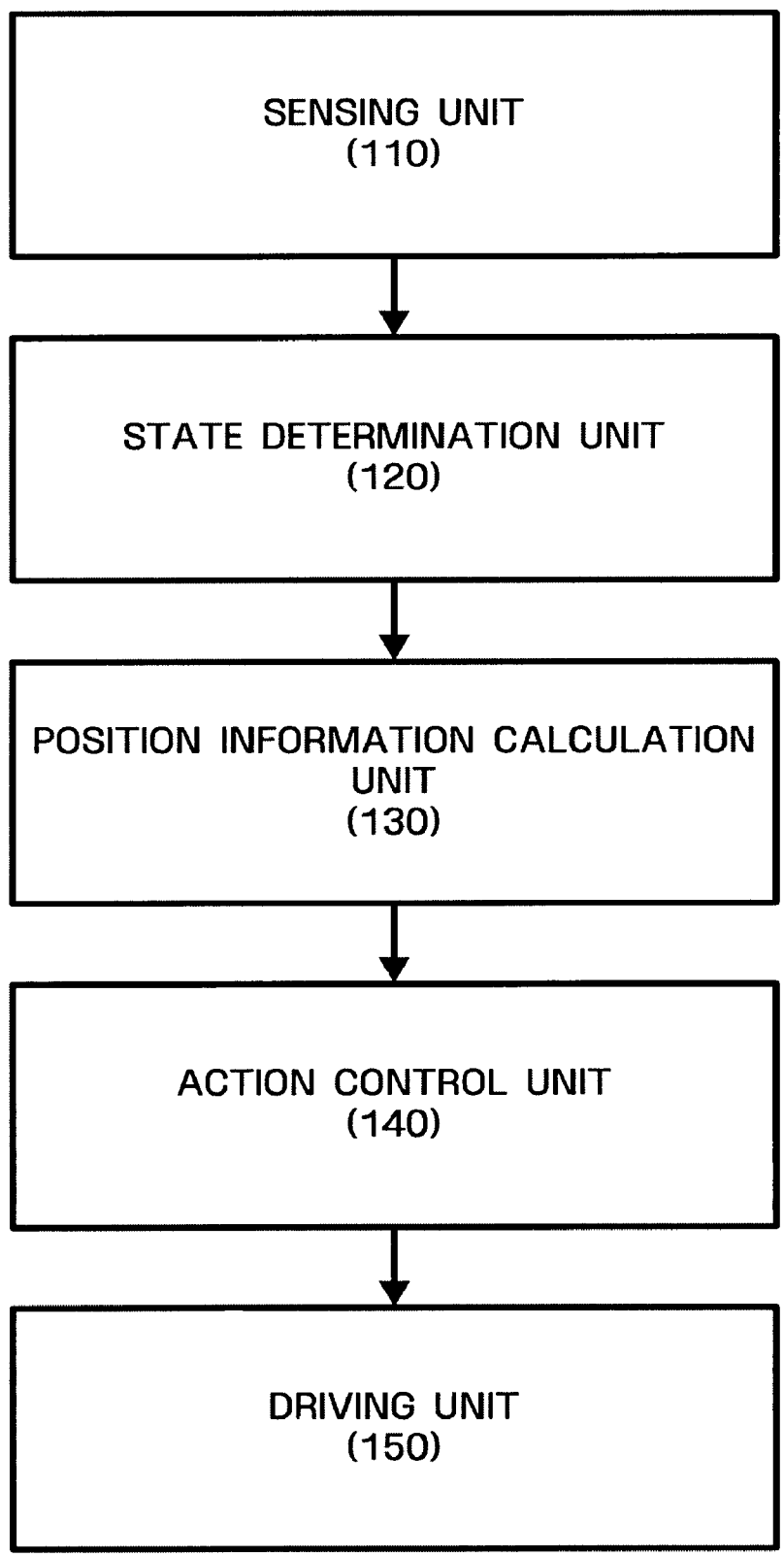
FIG. 2 is a block diagram illustrating a structure of a moving apparatus for providing a position correction function according to an exemplary embodiment of the present invention.

FIG. 2 is a block diagram illustrating a structure of a moving apparatus 100 for providing a position correction function according to an exemplary embodiment of the present invention. Referring to FIG. 2, the moving apparatus 100 providing the position correction function includes a sensing unit 110, a state determination unit (state determiner) 120, a position information calculation unit (position information calculator) 130, an action control unit (action controller) 140 and a driving unit (driver) 150.

Figure 3:
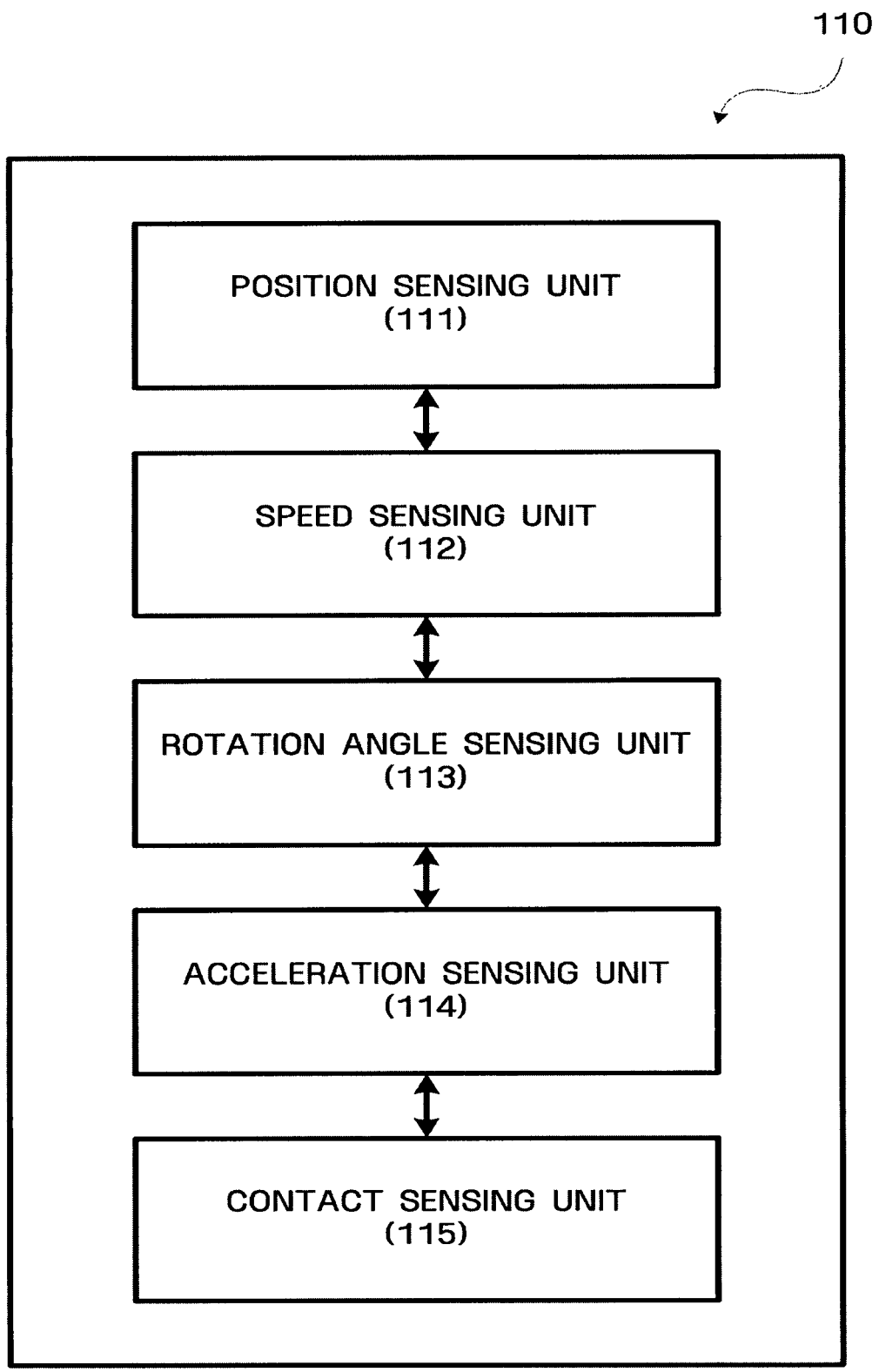
FIG. 3 is a diagram illustrating a structure of a sensing unit of the moving apparatus illustrated in FIG. 2.

The sensing unit 110 obtains multiple state information reflecting (indicating) one or more abnormal movement states occurring as the moving apparatus 100 travels to clean or build a map. A variety of sensors may be used in this sensing unit 110, and a structure of this sensing unit 110 will now be explained with reference to FIG. 3. The sensing unit 110 of FIG. 3 includes a position sensing unit (position sensor) 111, a speed sensing unit (speed sensor) 112, a rotation angle sensing unit (rotation angle sensor) 113, an acceleration sensing unit (acceleration sensor) 114, and a contact sensing unit (contact sensor) 115.

The position sensing unit 111 senses and obtains movement position information reflecting (indicating) a distance that the moving apparatus 100 travels. The acquisition of the movement position information can be performed by the encoder described above. By using the encoder, the position change ($\Delta X_e$) in the x axis direction and the rotation angle ($\Delta \theta_e$) of the moving apparatus 100 can be obtained. In order to obtain these values, first, a movement distance ($\Delta U$) moved by the moving robot 100 in each direction in a predetermined time should be obtained using the mean value of the movement distance ($U_R$) of a right driving wheel and the movement distance ($U_L$) by a left driving wheel of the moving apparatus 100. Then, assuming that the distance between the two wheels is D, the rotation angle ($\Delta \theta_e$) of the moving apparatus 100 can be obtained using an equation, $\Delta\theta_e=(U_R-U_L)/D$, and the position change $\Delta X_e$ is the same as $\Delta U$.

Accordingly, in this method, the movement position information, including the position change ($\Delta X_e$) in the x axis and the angle change ($\Delta\theta_e$) between the x axis and the direction of movement of the moving apparatus 100 can be obtained. Here, subscript e indicates the encoder.

The speed sensing unit 112 obtains speed information reflecting (indicating) the speed of movement of the moving apparatus 100 by referring to the obtained movement position information ($\Delta X_e$, $\Delta\theta_e$). The speed information can be expressed as $\Delta V_{xe}$, the acquisition of this speed information can also be obtained by the encoder. Here, subscript e also indicates the encoder.

The rotation angle sensing unit 113 obtains rotation angle information reflecting (indicating) the magnitude of the rotation angle about a coordinate axis of the 3D coordinate space illustrated in FIG. 1. The rotation angle information may indicate changes in a rotation angle about one axis or in rotation angles about all axes of the 3D space illustrated in FIG. 1. Changes in the rotation angles about all axes include a change ($\Delta\psi_g$) in the rotation angle (the roll direction) about the x axis, a change ($\Delta\phi_g$) in the rotation angle (the pitch direction) about the y axis, and a change ($\Delta\theta_g$) in the rotation angle (the yaw direction) about the z axis. This acquisition of the rotation angle information using an angular speed can be performed by the gyroscope described above. In an exemplary embodiment of the present invention, all the changes in the rotation angles about the three axes may be measured or only the change ($\Delta\theta_g$) in the rotation angle about the z axis may be measured. However, in the case of kidnapping, all the changes in the rotation angles about the three axes need to be measured. Here, subscript g indicates the gyroscope.

The acceleration sensing unit 114 obtains acceleration information reflecting (indicating) acceleration components of the 3 axes and gravitational acceleration. The acceleration information includes the acceleration component ($a_x$) in the x axis direction, the acceleration component ($a_y$) in the y axis direction, the acceleration component ($a_z$) in the z axis direction, and gravitational acceleration (g). This acquisition of the acceleration information can be performed by the gyroscope described above.

The contact sensing unit 115 obtains contact information reflecting (indicating) whether or not the moving robot 100 is in contact with the ground. The term ground denotes the earth, floor, pavement, or any like surface on which the moving apparatus moves.

The multiple state information may include all the movement position information, the speed information, the rotation angle information, the acceleration information and the content information.

Referring again to FIG. 2, the state determination unit 120 determines whether or not an abnormal movement state occurs due to self-contained navigation, by referring to the obtained multiple state information. When an abnormal movement state occurs, the position information calculation unit 130 corrects the multiple state information and thus calculates the final position information of the moving apparatus 100.

A process in which when an abnormal movement state occurs, the moving apparatus 100 determines and corrects the state will now be explained in more detail.

In the current exemplary embodiment of the present invention, an abnormal movement state occurring when the moving apparatus 100 travels can be broadly divided into 4 types. This classification method is only for convenience of explanation of the present exemplary embodiment and the present invention is not limited thereto. The 4 types of states are: first, a state where slipping or collision occurs and a rotation in the yaw direction occurs; secondly, a state where all of the driving wheels of the moving apparatus 100 pass an obstacle and a rotation in the pitch direction occurs; thirdly, a state where only one driving wheel passes an obstacle and a rotation in the roll direction occurs; and fourthly, a kidnapped state where the moving apparatus 100 itself is forcibly picked up and moved by a person.

First, the state where slipping or collision occurs and a rotation in the yaw direction occurs will now be explained.

The state determination unit 120 determines an occurrence of the abnormal movement state if the differential value between the position change ($\Delta\theta_e$) calculated based on the movement position information and the rotation angle change ($\Delta\theta_g$) calculated based on the rotation angle information is equal to or greater than a predetermined first threshold, that is, $|\Delta\theta_e-\Delta\theta_g|>Th1$.

Also, the state determination unit 120 determines an occurrence of the abnormal movement state if the differential value between the speed change ($\Delta V_{xe}$) calculated based on the speed information and the acceleration component ($a_x$) in parallel with the direction of movement calculated based on the acceleration information is equal to or greater than a predetermined second threshold, that is, $|\Delta V_{xe}-a_x|>Th2$.

Also, the state determination unit 120 determines an occurrence of the abnormal movement state if the magnitude of the acceleration component ($a_y$) that is in parallel with the ground and perpendicular to the direction of movement and calculated based on the acceleration information is equal to or greater than a predetermined third threshold, that is, $|a_y|>Th3$.

When the three conditions described above are selectively satisfied, the position information calculation unit 130 corrects the movement position information with respect to direction in which the moving apparatus 100 proceeds, and thus, calculates the final position information. This can be expressed as equation 1 below:

$$\Delta\theta=\Delta\theta_g$$
$$\Delta x=\iint a_x\,dtdt \text{ or } 0$$
$$\Delta y=\iint a_y\,dtdt \text{ or } 0 \qquad (1)$$

That is, in order to compensate for the slipping or collision, an actual driving distance moved in a short time can be calculated by performing twice the integral operation of the acceleration component with respect to time. However, since the precision to be obtained with a current low-priced accelerometer may not be enough, the movement distance at the time of slipping may be set to 0 so that errors can be minimized.

Secondly, the state where all of the driving wheels of the moving apparatus 100 pass through an obstacle and a rotation in the pitch direction occurs will now be explained. In this case, the state determination unit 120 determines an occurrence of the abnormal movement state if the magnitude of the acceleration component ($a_z$) perpendicular to the ground calculated based on the acceleration information is different from the magnitude of the gravitational acceleration (g) calculated based on the acceleration information, and the change ($\Delta\phi_g$) in the rotation angle (the pitch direction) about the y axis is equal to or greater than a predetermined fourth threshold. That is, when $|a_z|\neq|g|$, the condition $\Delta\phi_g>Th4$ should be satisfied.

The position information calculation unit 130 corrects the movement position information with respect to the pitch angle and thus calculates the final position information. This can be expressed as equation 2 below:

$$\Delta X = \Delta X_e * \cos \phi_g \quad (2)$$

Here, $\Delta X_e$ is the movement position information in the x axis direction obtained by the encoder of the speed sensing unit 112 and the pitch angle ($\phi_g$) can be obtained using angular speed information of the 3 axes.

Thirdly, the state where only one driving wheel passes an obstacle and a rotation in the roll direction occurs will now be explained.

In this case, the state determination unit 120 determines an occurrence of the abnormal movement state if the magnitude of the acceleration component ($a_z$) perpendicular to the ground calculated based on the acceleration information is different from the magnitude of the gravitational acceleration (g) calculated based on the acceleration information, and the change ($\Delta\psi_g$) in the rotation angle (the roll direction) about the x axis is equal to or greater than a predetermined fifth threshold. That is, when $|a_z| \neq |g|$, the condition $\Delta\psi_g > Th5$ should be satisfied.

At this time, the position information calculation unit 130 corrects the movement position information with respect to the roll angle and thus calculates the final position information. This can be expressed as equation 3 below:

$$\Delta\theta = \Delta\theta_g / \cos \psi_g \quad (3)$$

Here, $\Delta\theta_g$ is the change ($\Delta\theta_g$) in the yaw direction obtained by the rotation angle sensing unit 113 and accordingly, if the change ($\Delta\theta_g$) is divided by the cosine value of the roll angle ($\psi_g$), a corrected rotation angle, $\Delta\theta$, can be obtained.

Meanwhile, a case where the moving apparatus 100 rotates on an inclined plane should be distinguished from the third case described above. In order to distinguish these cases, when the moving apparatus 100 rotates, if the acceleration component $a_z$ in the z axis direction changes, it corresponds to the third case, and if the acceleration component $a_z$ does not change and is constant, it is determined to be a case where the moving robot 100 rotates on an inclined plane and no correction should be performed.

Fourthly, the so-called kidnapped state where the moving apparatus 100 itself is forcibly picked up and moved by a person or a machine will now be explained. In this case, the state determination unit 120 determines an occurrence of the abnormal state if the contact state calculated based on the contact information indicates no contact, and the difference between the acceleration component ($a_z$) perpendicular to the ground calculated based on the acceleration information and the gravitational acceleration is equal to or greater than a predetermined sixth threshold, that is, $|a_z - g| > Th6$. The position information calculation unit 130 corrects the movement position information with respect to the movement distance calculated based on the acceleration information and the change in the rotation angle calculated based on the rotation angle information, and thus calculates the final position information.

As described above, predetermined thresholds Th1 through Th6 are introduced in the current exemplary embodiment so that the state determination unit 120 can determine whether or not the abnormal movement state of the moving apparatus 100 occurs. However, predetermined values do not need to be set as the thresholds and a value that can be a criterion for determining whether or not the abnormal movement state occurs can be used as one of thresholds Th1 through Th6.

Meanwhile, referring again to FIG. 2, the action control unit 140 generates an action control signal of the moving apparatus 100 by referring to the final position information calculated according to any of the four cases described above. The driving unit 150 enables the movement action of the moving apparatus 100 to be performed by referring to the generated action control signal.

Figure 4:
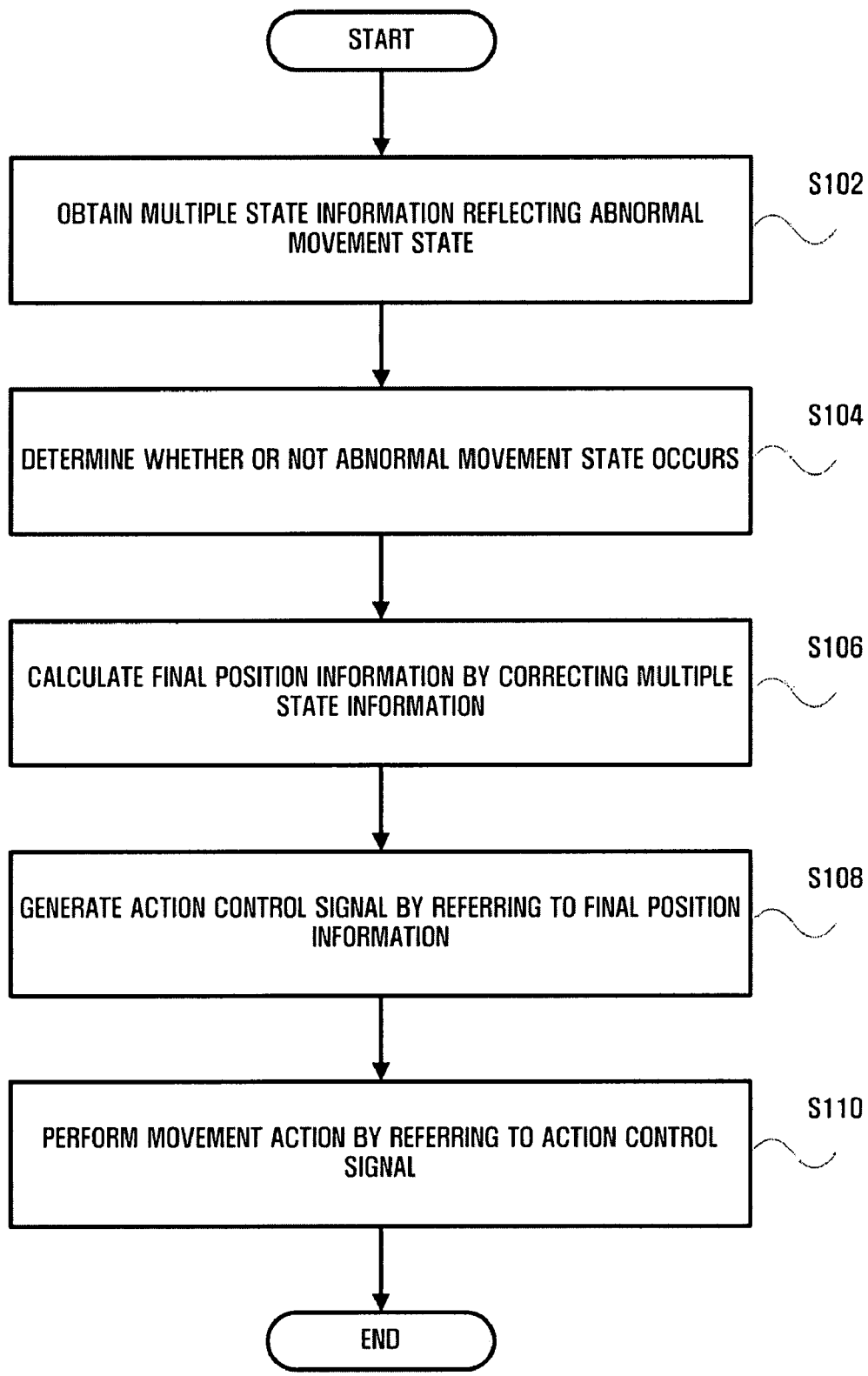
FIG. 4 is a flowchart of a method of correcting a position according to an exemplary embodiment of the present invention.

FIG. 4 is a flowchart of a method of correcting a position according to an exemplary embodiment of the present invention.

First, the sensing unit 110 obtains multiple state information reflecting (indicating) one or more abnormal movement states occurring as the moving apparatus 100 travels in operation S102. Then, the state determination unit 120 determines whether or not the abnormal movement state is generated by self-contained navigation, by referring to the obtained multiple state information in operation S104. Next, as the abnormal movement state occurs, the position information calculation unit corrects the multiple state information, and calculates final position information of the moving apparatus 100 in operation S106. Then, the action control unit 140 generates an action control signal by referring to the calculated final position information in operation S108. Finally, the driving unit 150 performs the movement action of the moving apparatus 100 by referring to the generated action control signal in operation S110.

According to the present invention as described above, by using the accelerometer together with the encoder and gyroscope that are used in the conventional technology, an abnormal movement state, such as slipping, collision with an obstacle, passing through an obstacle, and kidnapping of the moving robot can be determined, and thus, errors can be minimized. As a result, the performance of a localization system that is used in the moving apparatus, such as a cleaning robot, can be enhanced by the apparatus and method of the present invention.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include wireless transmission media including a carrier wave transmitting signals specifying instructions, data structures, data files, etc. communicating with an access point coupled to a computing device or network. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module" or component, as used herein, denotes, but is not limited to, a software component, a hardware component, or a combination of a software component and a hardware component, which performs certain tasks. A module or component may advantageously be configured to reside on the addressable storage medium/media and configured to execute on one or more processors. Thus, a module or component may include, by way of example, components, such as software components, application specific software component, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s).

The computer readable code/instructions and computer readable medium/media may be those specially designed and constructed for the purposes of the present invention, or they may be of the kind well-known and available to those skilled in the art of computer hardware and/or computer software.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A moving apparatus comprising:
a sensing unit to obtain multiple state information generated by movements of the moving apparatus;
a state determiner to determine whether or not an abnormal movement state is generated based on the multiple state information;
a position information calculator to correct the multiple state information when the abnormal movement state occurs, and to calculate final position information of the moving apparatus;
an action controller to generate an action control signal based on the calculated final position information; and
a driver to perform a movement action of the moving apparatus based on the generated action control signal,
wherein the multiple state information comprises acceleration information indicating acceleration components of three axes and gravitational acceleration.

2. A moving apparatus comprising:
a sensing unit to obtain multiple state information generated by movements of the moving apparatus;
a state determiner to determine whether or not an abnormal movement state is generated based on the multiple state information;
a position information calculator to correct the multiple state information when the abnormal movement state occurs, and to calculate final position information of the moving apparatus;
an action controller to generate an action control signal based on the calculated final position information; and
a driver to perform a movement action of the moving apparatus based on the generated action control signal,
wherein the sensing unit comprises:
a position sensor to obtain movement position information, which indicates a distance of movement of the moving apparatus;
a speed sensor to obtain speed information, which indicates a moving speed based on the movement position information;
a rotation angle sensor to sense rotation angle information, which indicates direction and magnitude of a rotation angle of the moving apparatus;
an acceleration sensor to obtain acceleration information, which indicates acceleration components of three (3) axes and gravitational acceleration; and
a contact sensor to obtain contact information, which indicates whether or not the moving apparatus is in contact with the ground,
wherein the multiple state information comprises the movement position information, the speed information, the rotation angle information, the acceleration information, and the contact information.

3. The apparatus of claim 2, wherein the abnormal movement state is a state in which a collision between the moving apparatus and an obstacle occurs.

4. The apparatus of claim 3, wherein the state determiner determines an occurrence of the abnormal movement state if the differential value between the change in the position calculated based on the movement position information and the change in the rotation angle calculated based on the rotation angle information is equal to or greater than a predetermined first threshold.

5. The apparatus of claim 3, wherein the state determiner determines an occurrence of the abnormal movement state if the differential value between the change in the speed calculated based on the speed information and the acceleration component in parallel to the direction of movement calculated based on the acceleration information is equal to or greater than a predetermined second threshold.

6. The apparatus of claim 3, wherein the state determiner determines an occurrence of the abnormal movement state if the magnitude of the acceleration component that is calculated based on the acceleration information and is in parallel with the ground and perpendicular to the direction of movement is equal to or greater than a predetermined third threshold.

7. The apparatus of claim 3, wherein the state determiner determines an occurrence of the abnormal state if the magnitude of the acceleration component perpendicular to the ground calculated based on the acceleration information is different from the magnitude of the gravitational acceleration, and the change in the angle ($\Delta\phi_g$) in the pitch direction calculated based on the rotation angle information is equal to or greater than a predetermined fourth threshold.

8. The apparatus of claim 3, wherein the state determiner determines an occurrence of the abnormal state if the magnitude of the acceleration component perpendicular to the ground calculated based on the acceleration information is different from the magnitude of the gravitational acceleration, and the change in the rotation angle ($\Delta\psi_g$) in the roll direction calculated based on the rotation angle information is equal to or greater than a predetermined fifth threshold.

9. The apparatus of claim 3, wherein the position information calculator corrects the movement position information with respect to direction in which the moving apparatus proceeds and calculates the final position information.

10. The apparatus of claim 2, wherein the abnormal movement state is a state in which the moving apparatus is inclined in a pitch direction with respect to direction of movement while the moving apparatus passes an obstacle.

11. The apparatus of claim 10, wherein the position information calculator corrects the movement position information with respect to the pitch angle calculated based on the acceleration information, and thus calculates the final position information.

12. The apparatus of claim 2, wherein the abnormal movement state is a state in which the moving apparatus is inclined in a roll direction with respect to direction of movement while the moving apparatus passes an obstacle.

13. The apparatus of claim 12, wherein the position information calculator corrects the movement position information with respect to the roll angle calculated based on the acceleration information and thus calculates the final position information.

14. The apparatus of claim 2, wherein the abnormal state is a state in which the moving apparatus is in a kidnapped state.

15. The apparatus of claim 14, wherein the state determiner determines an occurrence of the abnormal state if the contact state calculated based on the contact information indicates no contact, and the difference between the acceleration component perpendicular to the ground calculated based on the acceleration information and the equal to or greater than a predetermined sixth threshold.

16. The apparatus of claim 14, wherein the position information calculator corrects the movement position information with respect to the movement distance calculated based on the acceleration information and the change in the rotation angle calculated based on the rotation angle information and thus calculates the final position information.

17. A method of correcting a position of a moving apparatus, the method comprising:
 obtaining multiple state information generated by movements of the moving apparatus;
 determining whether or not the abnormal movement state is generated based on the obtained multiple state information;
 correcting the multiple state information when the abnormal movement state occurs, and calculating final position information of the moving apparatus;
 generating an action control signal by referring to the calculated final position information; and
 performing a movement action of the moving apparatus by referring to the generated action control signal,
 wherein the multiple state information comprises acceleration information indicating acceleration components of three axes and gravitational acceleration.

18. At least one medium comprising computer readable instructions to implement the method of claim 17.

19. The method of claim 17, wherein the calculating final position information comprises determining a final position in a direction x according to $\Delta x = \Delta x_e * \cos \phi_g$,
 wherein $\Delta x$ is the change in position in the x direction during the abnormal movement state, $\Delta x_e$ is movement position information obtained according to the speed information, and $\phi_g$ is a pitch angle of the moving apparatus during the abnormal movement.

20. The method of claim 17, wherein the calculating final position information comprises determining a final position in a yaw direction of the moving apparaus according to $\Delta \theta = \Delta \theta_g / \cos \psi_g$, wherein $\Delta \theta$ is a change in yaw position of the moving apparatus during the abnormal movement, $\Delta \theta_g$ is sensed change in the yaw position during the abnormal movement, and $\psi_g$ is a roll position of the moving apparatus.

21. A method of correcting a position of a moving apparatus, the method comprising:
 obtaining multiple state information generated by movements of the moving apparatus;
 determining whether or not the abnormal movement state is generated based on the obtained multiple state information;
 correcting the multiple state information when the abnormal movement state occurs, and calculating final position information of the moving apparatus;
 generating an action control signal by referring to the calculated final position information; and
 performing a movement action of the moving apparatus by referring to the generated action control signal,
 wherein the obtaining of the multiple state information comprises:
 obtaining movement position information, which indicates a distance of movement of the moving apparatus;
 obtaining speed information, which indicates a moving speed by referring to the movement position information;
 obtaining rotation angle information, which indicates the direction and magnitude of the rotation angle of the moving apparatus;
 obtaining acceleration information, which indicates the acceleration components of three (3) axes and gravitational acceleration; and
 obtaining contact information, which indicates whether or not the moving apparatus is in contact with the ground,
 wherein the multiple state information comprises the movement position information, the speed information, the rotation angle information, the acceleration information and the contact information.

22. A method of correcting a position of a moving apparatus, the method comprising:
 obtaining multiple state information generated by movements of the moving apparatus;
 determining whether or not the abnormal movement state is generated based on the obtained multiple state information;
 correcting the multiple state information when the abnormal movement state occurs, and
 calculating final position information of the moving apparatus, comprising determining a final position in a direction x according to $\Delta x = \iint a_x \, dt dt$,
 wherein $\Delta x$ is the change in position in the x direction during the abnormal movement state, and $a_x$ is the acceleration in the x direction during the abnormal movement state.

23. The method of claim 22, wherein the multiple state information comprises movement position information, speed information, rotation angle information, acceleration information and contact information.

24. At least one medium comprising computer readable instructions to implement the method of claim 22.

* * * * *

UNITED STATES PATENT AND TRADEMARK OFFICE
CERTIFICATE OF CORRECTION

PATENT NO. : 7,768,417 B2
APPLICATION NO. : 11/707992
DATED : August 3, 2010
INVENTOR(S) : Ki-wan Choi et al.

It is certified that error appears in the above-identified patent and that said Letters Patent is hereby corrected as shown below:

Column 12, Line 5 delete "apparaus" and insert -- apparatus --, therefor.

Signed and Sealed this

Seventh Day of December, 2010

David J. Kappos
*Director of the United States Patent and Trademark Office*